United States Patent [19]

Distin et al.

[11] Patent Number: 4,620,456

[45] Date of Patent: * Nov. 4, 1986

[54] NUTATING DRIVE MECHANISMS HAVING SPHERICAL BALL DRIVING ELEMENTS

[75] Inventors: Robert Distin, Louisville; James E. Shaffer, Longmont, both of Colo.

[73] Assignee: Advanced Energy Concepts '81, Limited, Boulder, Colo.

[ * ] Notice: The portion of the term of this patent subsequent to Apr. 29, 2003 has been disclaimed.

[21] Appl. No.: 434,972

[22] Filed: Oct. 18, 1982

[51] Int. Cl.[4] .............................................. F16H 1/28
[52] U.S. Cl. ...................................................... 74/800
[58] Field of Search .................... 74/63, 216.3, 412 R, 74/424.8 NA, 640, 750 R, 796, 800, 804, 805

[56] References Cited

U.S. PATENT DOCUMENTS

| Re. 17,811 | 9/1930 | Braren | 74/804 |
|---|---|---|---|
| 1,277,193 | 8/1918 | Cassel | 74/63 |
| 2,020,123 | 11/1935 | Pollard | 74/63 |
| 3,085,451 | 4/1963 | Morin | 74/800 |
| 3,590,659 | 7/1971 | Maroth | 74/800 |
| 3,640,154 | 2/1972 | Massie | 74/800 |
| 4,069,718 | 1/1978 | F'Geppert | 74/206 |

FOREIGN PATENT DOCUMENTS

| 156310 | 6/1939 | Austria | 74/800 |
|---|---|---|---|
| 60889 | 3/1925 | Sweden | 74/63 |
| 328907 | 5/1930 | United Kingdom | 74/800 |
| 2085994 | 5/1982 | United Kingdom | 74/800 |

*Primary Examiner*—Lawrence Staab
*Attorney, Agent, or Firm*—Sughrue, Mion, Zinn, Macpeak, and Seas

[57] ABSTRACT

A nutating gear reduction mechanism employs two series of rolling elements in the form of balls as the means of torque transmission. In this manner, gear teeth are eliminated and replaced with conjugate pairs of trochoidally cut grooves, with the rolling elements operating between the grooves formed in a wobble member, on the one hand, and a stator and an output member, on the other hand. Either single or multiple stage speed reduction may be achieved, the single stage version being obtained by replacing one set of conjugate trochoidal races with oval races coupling the wobble member and either the stator or the output member in a constant velocity fashion.

11 Claims, 9 Drawing Figures

NUTATING DRIVE MECHANISMS HAVING SPHERICAL BALL DRIVING ELEMENTS

BACKGROUND OF THE INVENTION

Nutating type torque transmitting systems are well known for their utility as speed reduction mechanisms. Typically, an input member will be provided with means initiating nutating or wobbling movement on the part of an intermediate idler member. This member may be coupled through gear teeth to both a reaction member or stator and an output gear. Depending upon the design of the teeth, the wobble member may be made to advance, recess, or remain stationary with respect to the stator, while the output member is rotated due to the progressive camming action between interengaging idler and output gear teeth.

Nutating drives of the general type just described, however, suffer from a number of disabilities. In particular, such gearing systems are often quite expensive to produce, since the gear teeth are difficult to manufacture due to the fact that they must be quite accurately machined. Furthermore, the prior art nutating gear systems are unable to maintain more than only a few teeth in contact at any given time, due to the wobbling motion of the intermediate member and the inherent limitations of gear teeth. Of course, the torque transmission capability of such gear systems suffers as a result.

As noted above, all known prior art nutating mechanisms employ coacting teeth as at least part of the torque transmitting means. The only known example of a prior art system which does not exclusively employ teeth for torque transmission purposes is disclosed in the patent to Vallance, U.S. Pat. No. 1,748,907. This reference discloses a nutating gear mechanism wherein an input shaft initiates wobbling motion of a member 7 via the engagement of a portion 9b of this member with an angled portion of the input shaft 2. Radially outwardly on the member 7 are disposed a train of teeth 10 which engage stator teeth 11 formed on a portion of the stationary housing 5. Inside the cup-shaped member 7 are arranged a number of hemispherical recesses 7b, in which are fixedly seated a like number of balls 8. These balls are in turn in engagement with a continuous curved groove 6b formed in output member 6. The engagement between teeth 10, 11 prevents the intermediate element 7 from rotating during nutation, so that output rotation is effected solely by means of the engagement between the balls and the groove. As the wobble member nutates, the balls 8 successively cam the element 6 rotationally by engaging the walls of the groove.

As above described, the Vallance device suffers from the same disabilities noted in the general discussion above. Although being quite different from the present invention in both structure and operation, this patent nevertheless does generally teach the idea that torque transmission may be obtained in nutating devices by using elements other than mere teeth alone.

Other prior art nutating mechanisms employing rolling elements in some capacity are disclosed in U.S. Pat. Nos. 3,139,772, 2,913,911, 3,525,890, and 3,094,880. The rolling elements in these patents are usually used as a means of initiating nutating motion, rather than as torque transmitting elements.

SUMMARY OF THE INVENTION

The present invention represents an economical and more efficient alternative to prior nutational speed reduction mechanisms and is at the same time more flexible in use. The device is made with a minimum number of parts, and these parts may be interchangeable in order to achieve different reduction ratios.

The drive system includes a central intermediate wobbling member which is provided with at least one trochoidally cut groove therein, which engages a series of balls which simultaneously engage a trochoidally cut groove in one of the output or the stator member. The intermediate member is provided with at least one additional ball groove or race therein, which, if a double reduction gearing mechanism is desired, may be formed with trochoidal curvature. If lower speed ratios are desired, this second race may be cut in an oval manner such that a second stage speed reduction does not occur. In either event, the coacting member (stator or output) is formed with a correspondingly formed ball race or groove therein.

DETAILED DESCRIPTION OF THE PREFERRED EMBODIMENTS

Figure 1:
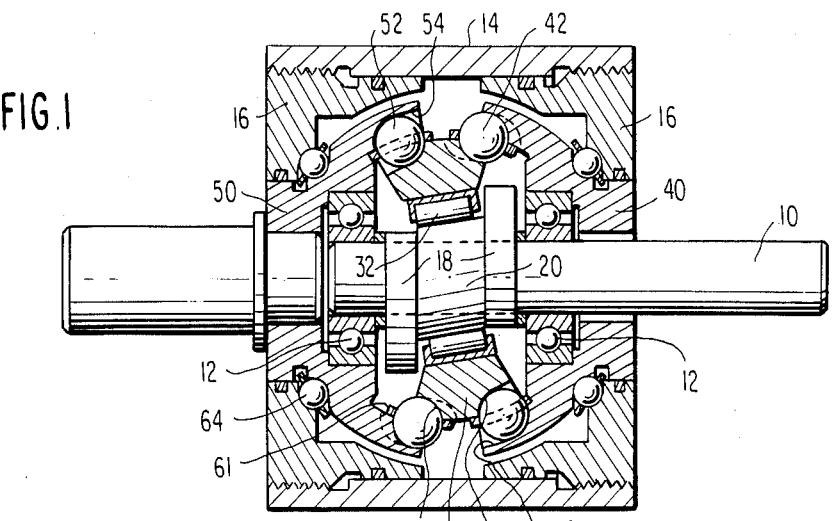
FIG. 1 illustrates a first embodiment of the present invention wherein either a single or dual stage reduction may be achieved.

Turning now to the drawing figures, and in particular to FIG. 1, a first embodiment of the present invention is depicted wherein an input shaft 10 is journaled for rotation by means of a pair of ball or roller bearings 12. As is easily seen from the drawings, the input shaft 10 is provided with a pair of counterweights 18 arranged on either side of an inclined cam 20. The purpose of the counterweights is to cancel dynamic system imbalances as discussed hereafter, while the angled cam 20 is used to initiate nutating motion on the part of an intermediate member 30 through the intermediary of a ring of roller bearings 32.

The gearing mechanism further includes a substantially cylindrical housing 14 receiving circular end pieces 16 at either side thereof. As shown in FIG. 1, the housing 14 and the end pieces 16 may be threaded and screwed together, for easy assembly. The elements 16 and the housing 14 together define an internal space occupied by the input shaft 10, nutating intermediate idler member 30, stator 40 and output member 50. Normally, means are provided for non-rotatively connecting the stator to one or the other of the end pieces 16.

The intermediate wobble member 30 is in constant rolling contact with both the stator member 40 and the output member 50 via the intermediary of two series of balls 42, 52, respectively. To this end, the output member 50 is provided as a generally cup shaped member having an axially undulating groove 54 of hypotrochoidal curvature cut therein.

The intermediate member 30 is provided with a conjugate, coacting epitrochoidal groove 56. By "conjugate" is meant that the curvature of the epitrochoidal groove 56 and the hypotrochoidal groove 54 are related in such a way that balls 52 are in substantially continuous contact with the surfaces of both of these grooves, such that the balls 52 roll as they transmit torque. The particular epitrochoidal and hypotrochoidal shapes for the ball races can be generated in a manner similar to that described in copending patent application Ser. No. 313,442, by the same inventors, the disclosure of which is hereby incorporated by reference. The balls are separated during their rolling movement by means of a ball cage or carrier member 61, which will be discussed in more detail hereafter.

On the other side of the nutating member 30 is arranged a further epitrochoidal ball groove or race 60 which is in contact with the second series of balls 42. The stator member 40 is provided with a conjugate hypotrochoidal groove 62, such that the balls 42 are constantly rollingly engaged between elements 30 and 40. The grooves 60, 62 are substantially identical to grooves or races 56, 54, except that the number of teeth or "lobes" formed by these races will differ in number. However, within a conjugate pair of epi- and hypotrochoidal races, the difference in the number of lobes is always 2, with the larger number nominally on the radially larger or "outer" gear element which contains the hypotrochoidal race.

For a double stage reduction, the groove 60 is provided with epitrochoidal curvature, while the groove 62 is provided as a hypotrochoid as just noted. In this manner, the speed of rotation of the intermediate member will be dictated by the engagement between the intermediate member 30 and the stator 40, while the output rotational speed will be determined by the engagement between the rotating intermediate member 30 and the output member 50, which is journaled for rotation by a series of ball bearings 64.

If only a single stage reduction is desired, the ball races or grooves 60, 62 are not formed with conjugate trochoidal curvature, but are rather cut as a series of coacting ovals. Due to this configuration, the intermediate member 30 is prevented from rotating relative to the stator 40, although nutating motion is, of course, allowed. In this case, the only speed reduction is that achieved between the intermediate nutating member 30 and the output member 50. As the wobble member is nutating at the input speed but not rotating, the speed reduction through the gearing is determined wholly by the conjugate ball races 54, 56 and in particular the number of "lobes" therein. This is similar in concept to conventional nutating gear mechanisms, wherein the speed reduction is normally a function of the numbers of teeth and the difference in the numbers of teeth provided on the wobble member and output member.

In the simple single reduction case, the speed reduction may be easily calculated via the following formula:

$$\frac{\text{input speed}}{\text{output speed}} = \frac{1}{1 - \frac{n_1}{n_2}} \quad (1)$$

Where:
$n_1$ = number of lobes on the driving member, and
$n_2$ = number of lobes on the driven member.

The difference between $n_1$ and $n_2$ is always equal to 2, while the number of rolling elements will equal the integer number between $n_1$ and $n_2$. For example, if the intermediate member epitrochoidal race 56 is provided with 14 "lobes", and the output member ball race 54 is provided with 16 such lobes, there will nominally be 15 balls operating between the two races. From the formula given above, the speed ratio of such a configuration can be calculated to be 8:1, since, in this case, the epitrochoidal race 56 constitutes the driving member, while the output member ball race constitutes the driven member.

It should be noted that the cage or assembly housing the balls will rotate at a speed determined by the following equation for the case of 1 speed reduction:

$$\frac{\text{input speed}}{\text{speed of cage}} = \frac{1}{1 - \frac{n}{n_B}}$$

where $N_B$ represents the number of balls in the cage, this speed being about one half of the rotational speed of the intermediate member.

In the case where both the stator 40 and the output member 50 are in engagement with the wobble member 30 by means of conjugate trochoidaly cut races, i.e., where a dual speed reduction is desired, the speed ratio of the gear may be calculated via the formula below:

$$\frac{\text{input speed}}{\text{output speed}} = \frac{1}{1 - \frac{n_1 \, ''n_3}{n_2 \, ''n_4}} \quad (2)$$

Where:
$n_1$ = number of stator teeth or lobes,
$n_2$ = number of lobes on the first idler ball race (60),
$n_3$ = number of lobes on the second idler ball race (56), and
$n_4$ = number of output member lobes.

For two speed reductions, the rotational speed of the cage for the second set of balls is given by:

$$\frac{\text{input speed}}{\text{speed of second cage}} = \frac{1}{1 - \frac{n_1 \, ''n_3}{n_2 \, ''n_{B2}}}$$

where $N_{B2}$ is the number of balls in the second cage.

As an example, if the number of teeth or lobes of the trochoidal race ways of the stator 40, first and second idler race ways 60, 56, and output member 50 of FIG. 1 are 17, 15, 16 and 18, respectively, the speed ratio of the device can be calculated to be −135:1, where the negative sign indicates that the output rotation is in the direction opposite the input rotation. The reduction ratio may easily be changed by replacing the output member, stator and intermediate member with like members having different numbers of lobes formed in the driving raceways thereof. In fact, it should be noted that the stator and the output member of the embodiment illustrated in FIG. 1 are identical members but for the differing numbers of teeth or lobes. The ability to make several of the parts of the invention substantially identically obviously makes for cost savings in manufacture.

As a further example, let it now be supposed that the number of teeth or lobes on the trochoidal races of the stator, first and second races 60, 56 and output member 50 are 18, 16, 15 and 17, respectively. In this instance, it can be readily calculated that the speed reduction ratio would be 136:1, where the output rotation now is in the same direction as the rotary input.

It will be noted that the foregoing equation becomes indefinite when $n_1 \cdot n_3 = n_2 \cdot n_4$. In other words, an "infinite" reduction ratio is achieved. In reality, the effect of such a condition would be to cause the nutating member 30 to rotationally recess or advance with respect to the input rotation at a rate of speed such that the output member is driven neither forwardly nor reversely.

Referring further to the embodiment of FIG. 1, as noted previously, a pair of counterweights 18 are provided on both sides of the rotational cam member 20. As seen in FIG. 1, the nutating member 30 is always tilted somewhat, such that at high speed operation, the nutational motion will make the gear box tend to rock. In order to prevent this dynamic imbalance, the left hand counter weight in FIG. 1 compensates for the left hand "tilt" of the upper portion of the wobble member 30, while the right hand counterweight compensates for the right hand "tilt" of the lower portion of the wobble member. As the wobble member necessarily nutates at the same frequency as the input rotational speed, and thus the counterweights move with the "tilt", dynamic balancing is achieved.

As previously noted, the rolling torque transmitting elements 42, 52 are positionally maintained throughout their rolling motion by means of cage member 61. As seen in FIG. 1, the cage members may be in the form of spherical shell segments, which are provided with evenly spaced apertures for receiving the balls 42, 52. Again, the number of balls operating between the wobble member and either the stator or output member will be the number of epitrochoidal lobes, plus 1. As will be seen in the following, certain embodiments of the present invention are able to employ generally radially oriented carrier members, rather than the spherical shell members illustrated in FIG. 1.

Figure 2:
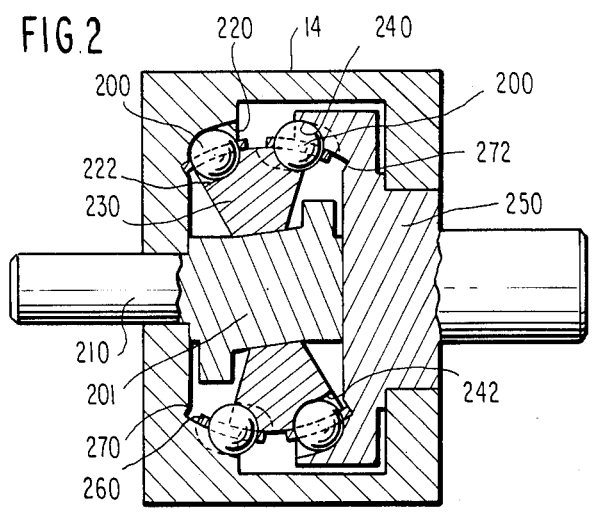
FIG. 2 illustrates a second simplified embodiment of the present invention using spherically trapped ball carriers.

In FIG. 2 is shown a second embodiment of the invention, which is illustrated in simplified form. In this device, the housing 14 incorporates the stator and the end pieces, previously provided separately. In addition, the housing 14 is provided generally in the form of a partially closed cup, and holds the various internal elements against any axial displacement by bearing directly against the input and output members. The embodiment of FIG. 2, as well as subsequent embodiments, are designed such that they may be easily and inexpensively produced from plastic material.

Referring further to FIG. 2, the illustrated device operates similarly to the embodiment of FIG. 1, in that rotation of the input shaft is translated into nutational or wobbling motion by means of an angled portion 201. The nutating member 230 is made to rotate owing to the engagement between a hypotrochoidal ball race 220 and an epitrochoidal ball race 222, via the intermediary of rolling ball race 200. As noted previously the hypotrochoidal ball race 220 may be cut directly into the internal surfaces of the housing member 14, thus constituting stator races. The epitrochoidal and hypotrochoidal ball races of FIG. 2, as well as subsequent embodiments, are substantially identical to the races used in the embodiment of FIG. 1. In the illustrated situation, the rotation of the member 230 will be opposite that of the input shaft 210, and at a rate determined by the relative numbers of teeth or lobes on the races 220, 222 since the stator contains the hypotrochoidal race 220 and the member 230 contains the epitrochoidal race 222. This rate may be easily calculated using equation (1), above, while noting that the race 220 is the driving member, and the race 222 is the driven member.

Output rotation is achieved via the engagement between hypotrochoidal ball race 240 and epitrochoidal race 242, again via the intermediary of the second ring of balls 200. As can be seen from FIG. 2, the race on output member 250 is somewhat larger than that on the stator, and correspondingly has a greater number of lobes. The final output speed and direction may be easily calculated by means of equation (2) above, but in any case this speed will be greatly reduced with respect to the input speed, by any desired factor within a wide range, such as 10:1 to 1000:1, for example.

In the FIG. 2 embodiment, it will be noted that spherical shell carrier members 260 are employed, these elements being spherically "trapped". In other words, the extent of the angular travel of the carriers 260 is limited by their engagement with stop surfaces 270, 272 on the stator and output member, respectively. The engagement between the carriers and the stop surfaces also tends to give an additional degree of mechanical stability to the device. Since the motion of the member 230 is nutational, the contact between the carriers 260 and the stop surfaces will be circularly rotationally progressive.

Figure 3:
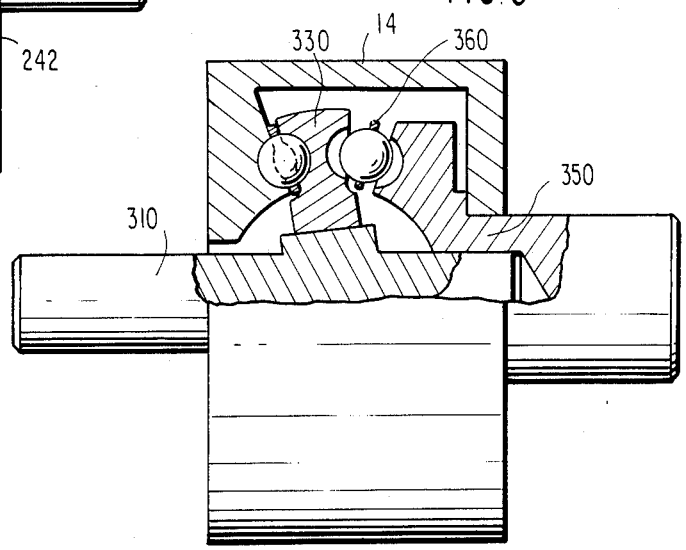
FIG. 3 depicts a third embodiment wherein a full-groove configuration is utilized employing pinched ball carriers.

In FIG. 3 is shown a further embodiment of the device, again of simplified design which may be manufactured in alternative materials such as plastic. The usual counterweights have been omitted for purposes of clarity. In this embodiment, the epi- and hypotrochoidal races are cut as full axially undulating grooves, e.g., having a width substantially equal to the diameter of the balls, as opposed to the only partial grooves of the prior embodiments. Similarly to FIG. 2, the housing 14 may be provided with the stator grooves directly cut therein, and the output member 350 may directly bear against one surface of the housing. The operation of the device according to FIG. 3 is identical to that of FIGS. 1 and 2 and thus will not be described in detail.

In this embodiment, the spherical shell carriers are replaced with generally radially oriented carriers 360. This design is quite useful in cases where it is desired to radially extend the wobble member 330 such that this member may be provided with the hypotrochoidal rather than the epitrochoidal grooves. Also, additional cost savings are realized due to that fact that the carrier members may be inexpensive stampings.

The carriers 360 in the FIG. 3 embodiment are generally described as "pinched" carriers, since, as illustrated in the left hand portion of FIG. 3, the carriers will be in abutting relationship with both the stator or output member and the idler 330 at the extremes of the wobbling movement of the latter. To this end, the depth of the trochoidal grooves in the respective members are designed such that, at the extreme, all of the ball except for that portion surrounded by the carriers 360 is received in one or the other of the grooves.

Figure 4:
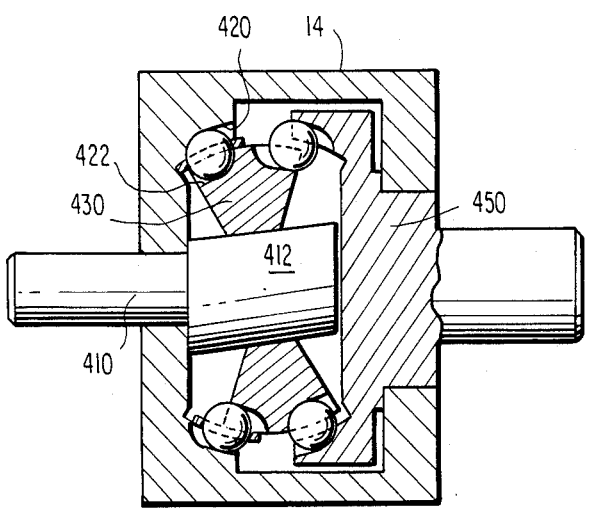
FIG. 4 illustrates a single stage reduction nutating gear mechanism similar to the embodiment of FIG. 2.

A further embodiment of the present invention is illustrated in FIG. 4, which is identical to the embodiment illustrated in FIG. 2, but for the fact that only a single stage reduction is achieved. In FIG. 4, the input shaft 410 initiates wobbling motion of the idler 430 by means of an angled portion 412 thereof. A single speed reduction is achieved via interengaging epitrochoidal and hypotrochoidal races 422, 420, respectively provided on the wobble member 430 and the stator. In the arrangement shown, the wobble member will be made to rotate reversely to the input, and at a speed determined by the numbers of lobes on the two trochoidal races, consistent with equation (1).

On the other side of the wobble member are cut oval grooves, which engage like grooves formed on the output member 450 via the intermediary of a second series of balls. In this manner, no additional speed reduction is achieved between the wobble member 430 and the output member 450, although rotary motion of the former is effectively transmitted to the latter at constant velocity. For this reason, the combination of the oval grooves on the wobble member and the output is designated as a "constant velocity coupling".

As an example, if the epitrochoidal race on the wobble member 430 is provided with 10 lobes, while the hypotrochoidal race 420 on the stator is provided with 12 such lobes, the resultant speed reduction ratio of the FIG. 4 device can be calculated to be −5:1.

Figure 9:
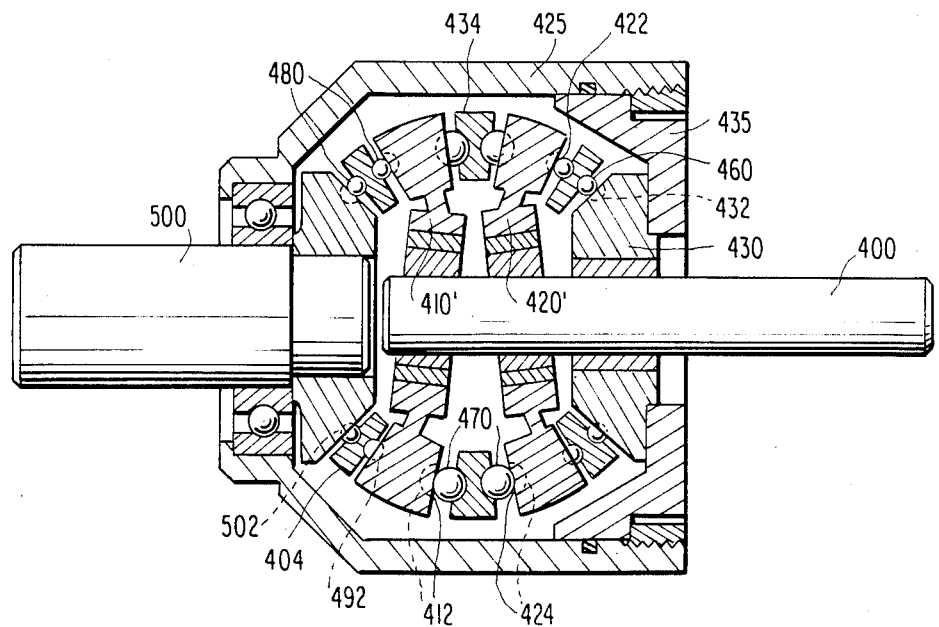
FIG. 9 shows a yet further embodiment of the invention wherein a triple stage reduction is achieved in a counterbalanced fashion by using a pair of input idler elements.

Turning now to FIG. 9, there is illustrated a further embodiment of the device wherein a three stage gear reduction is achieved. As is seen in FIG. 9, a pair of nutating idler members 410', 420' are provided, rather than the single idler of the prior embodiments.

In FIG. 9, a housing 425 bearingly supports an output shaft 500 for rotation, while an input shaft 400 extends within the housing through an aperture formed in a threaded end member 435 and a stator 430. Between the stator 430 and the first idler member 420', there is arranged a first series of caged tapered balls 460, which cooperate with the stator and the idler member similarly as in previous embodiments. Specifically, the idler member 420° and the stator 430 are provided with conjugate pairs of epitrochoidal and hypotrochoidal surfaces 432, 422, respectively, such that a first rotary speed reduction is obtained between the input shaft 400 and the first idler member 420'.

Operating between the idler members 410', 420' there is arranged a second series of balls 470, which, although resembling the series of balls 460, contain balls of about twice the size. Accordingly, there are only about one half as many of the large balls 470 as there are balls 460, for example. The idler 410' is provided with a surface 412 of trochoidal curvature on the side thereof facing the idler 420', while this latter mentioned member is provided with a conjugate trochoidal surface 424. The member of lobes on the idler surface 412 is either greater or less than the number of lobes on the idler surface 424 by two, with the surface having the greater number of lobes being the hypotrochoidal surface having the lesser number of lobes being the epitrochoidal surface. A second rotary speed reduction is obtained between the idler 420' and the idler 410' due to the ball engagement between the conjugate trochoidal surfaces 412, 424, although it should be noted that these members nutate at the same speed. As with prior embodiments, it should be understood that the assignment of the epitrochoidal lobes to the idler 410' and the hypotrochoidal lobes to the idler 420' is arbitrary.

In FIG. 9, a cross-section of the device is shown, such that at the bottom, one ball 470 is seen fully because at this position this ball abuts the crests of the lobes on both surfaces 412, 424. A cage member 434 maintains the balls 470 in spaced relationship in a manner similar to the carriers of the previously described embodiments, and at the top of FIG. 9, this member 434 alone is seen. At this point in the circular rolling movement of the balls 470 as shown at the top of FIG. 9, the ball will engage the "troughs" of either surface 412, 424, while these surfaces actually abut either side of the carrier member 434. This configuration of carrier may be used in the FIG. 1 embodiment as well, to replace the "spherically trapped" carriers thereof. The carriers of the present embodiment may aptly be termed as "pinched" carriers, since they will be progressively circumferentially engaged by portions of both the idlers 410', 420'.

It should be noted that the idlers 410', 420' are arranged in mirror-image fashion, such that the nutating motion of one idler mirrors the movement of the either. However, although the idlers do not nutate with respect to one another, they are capable of differential rates of rotation. By way of analogy, the motion of the two nutating idlers may be compared to that of a coin spinning on a mirrored surface, where the coin may rotate with respect to its mirror image.

An advantage of this configuration lies in the fact that no counterweights are required, as the device is dynamically counterbalanced. Basically, the two idlers 410', 420' balance each other's movement as they nutate oppositely, or in mirror image fashion, with respect to each other.

Between the idler 410' and the output member 500 are arranged the third series of balls 480, which are maintained separated by a pinched carrier 404, as are the balls 460. The idler 410' is provided with a surface 492 of hypotrochoidal curvature, while a conjugate epitrochoidal surface 502 is formed on the output member. Thus, a third rotary speed reduction is obtained between the idler 410' and the output 500. The overall speed reduction of the device may be easily calculated from the following formula, which, as can be seen, is merely an extension of equations (1) and (2) presented previously.

$$\frac{\text{Input speed}}{\text{Output speed}} = \frac{1}{1 - \frac{n_1 \cdot n_3 \cdot n_5}{n_2 \cdot n_4 \cdot n_6}}$$

Where:
- $n_1$ = number of stator lobes,
- $n_2$ = number of lobes on first idler surface 422,
- $n_3$ = number of lobes on first idler surface 424,
- $n_4$ = number of lobes on second idler trochoidal surface 412,
- $n_5$ = number of lobes on trochoidal idler surface 492, and
- $n_6$ = number of lobes formed on output trochoidal surface 502.

As can readily be verified by plugging-in sample values for the several lobe numbers, the reduction ratio obtainable with the device of FIG. 9 can easily reach several thousand to one. Differing ratios may be easily obtained, as was the case in earlier embodiments by merely placing the operative gear components with like components having different numbers of lobes. Also, within the confines of the present invention, it is possible to obtain any number of stages of speed reduction by suitably adding additional coacting element pairs having conjugate trochoidally formed surfaces as described hereinabove.

FIGS. 5–8 are two-dimensional and three-dimensional illustrations of geometric models which can be utilized for generating the undulating or lobed gear surfaces used in a nutating device constructed according to the present invention. Specifically, these models can be used to generate both epi- and hypocycloidal surfaces, as well as epi- and hypotrochoidal surfaces.

Figure 5:
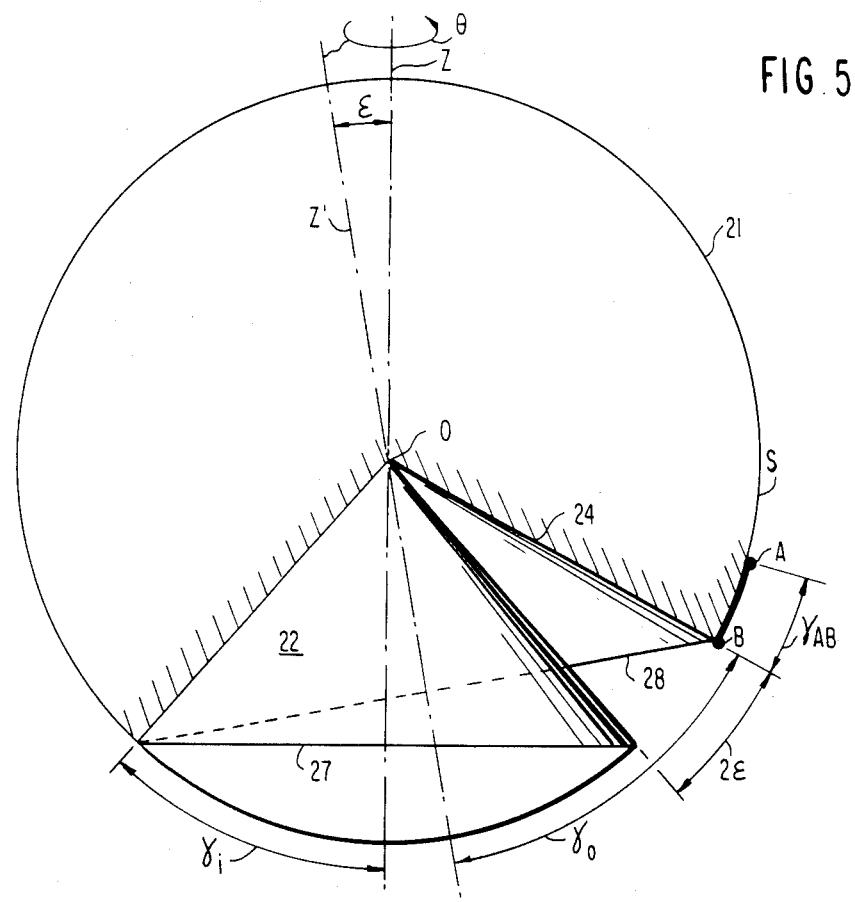
FIGS. 5 and 7 show two- and three-dimensional models, respectively, for generating epicycloidal and epitrochoidal surfaces.
Figure 7:
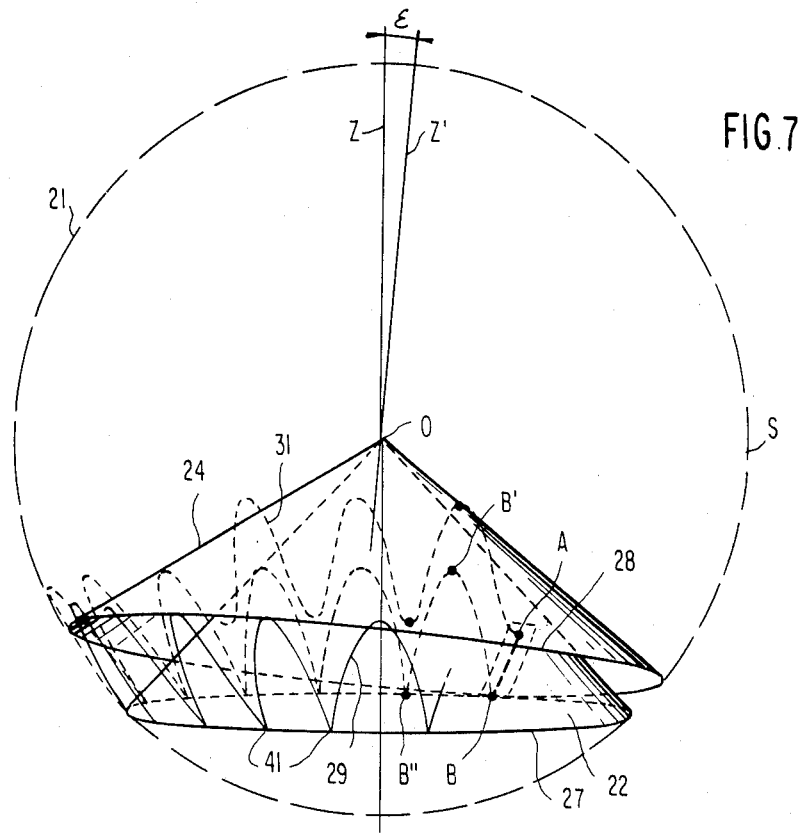

Referring initially to FIGS. 5 and 7 which illustrate a two- and three-dimensional model, respectively, for generating epicycloidal and epitrochoidal surfaces, a sphere 21 has a spherical surface S on which a fixed inner cone 22 is disposed, the cone 22 having a fixed Z axis which passes through an apex O of the inner cone 22. A lower circumferential line 27 of the inner cone 22 extends over an arc $2\gamma_i$ on the spherical surface S. An outer, movable cone 24 is disposed on the surface S around the inner cone 22, and the outer, movable cone 24 has a movable Z' axis which passes through the apex O, which is also the apex of the outer cone 24. The movable Z' axis is offset from the fixed Z axis by a predetermined angle $\epsilon$. A lower circumferential line 28 of the outer, movable cone extends over an arc $2\gamma_O$ on the spherical surface S. The outer, movable one 24 is capable of nutating about the fixed, inner cone 22 so that the movable Z' axis of the movable cone 24 revolves about the fixed Z axis of the inner cone 22 along the circle indicated generally by the symbol $\theta$ in FIG. 5. As the outer cone 24 nutates, varying portions of its lower circumferential line 28 are maintained in contact with varying portions of the lower circumferential line 27 of the inner cone. In FIG. 7, the outer cone has been nutated about the Z axis along the circle $\theta$ by approximately 100°–120° from the position shown in FIG. 5. The outer, movable cone 24 has a leg portion AB which lies on the spherical surface S, and the outermost point A of the leg portion AB is displaced from a point B on the lower circumferential line 28 of the outer cone 24 by an angle $\gamma_{AB}$.

Referring to FIG. 7, as the outer, movable cone 24 nutates so that its Z' axis revolves a little more than once around the Z axis of the fixed, inner cone 22, the point B on the lower circumferential line 28 of the outer cone 24 moves along a path portion BB'B" of an epicycloidal line 29. The epicycloidal line 29 is located on the spherical surface S. As the outer, movable cone and its Z' axis continue to undergo numerous nutations and revolutions, respectively, the point B will slowly trace out a complete, connected epicycloidal line 29. As FIG. 7 readily illustrates, the epicycloidal line 29 has a plurality of interconnected lobes comprising a plurality of "loops" which are connected together at a plurality of "nodes" 41. In addition, as the outer cone 24 undergoes the above-described nutations, the outermost point A of the leg portion AB of the outer cone will move along a path portion of an epitrochoidal line 31, only a portion of which is illustrated in FIG. 7. The epitrochoidal line 31, which is traced out by the point A, has the same number of lobes as the epicycloidal line 29, which is traced out by the point B. However, the epitrochoidal line 31 is smoother than the epicycloidal line 29, and the "nodes" interconnecting the "loops" of the epitrochoidal line lie on smooth, curved line portions rather than on sharp points, such as the points 41 on the epicycloidal line 29. Curved line portions are more advantageous than sharp points because the balls undergo smaller accelerations and decelerations and, hence, smaller velocity changes when traveling in races having smooth surfaces rather than races having sharp points. Therefore, the use of trochoidal surfaces results in a smoother running gear than does the use of cycloidal surfaces.

Once a first epicycloidal line 29 or a first epitrochoidal line 31 is formed, it is possible to form a corresponding epicycloidal or epitrochoidal surface from these lines. One method for doing this would be to fix a spherical ball to the points A or B of the outer cone 24 and, thereafter, nutate the outer cone until the ball undergoes one complete revolution about the Z axis of the inner cone. In practice, the above-described epicycloidal and epitrochoidal surfaces can be generated using machines which function in the manner described for the cones shown in FIGS. 5 and 7, and by attaching a spherical mill to the points A or B so that the desired surface configuration is formed.

Figure 6:
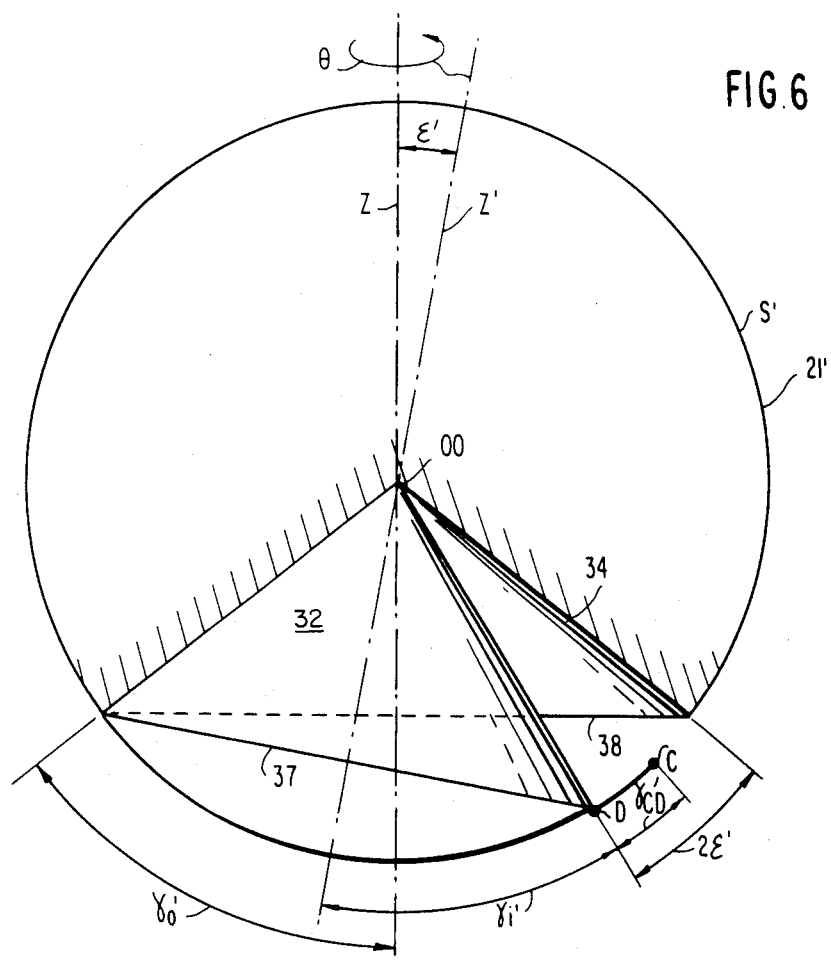
FIGS. 6 and 8 show two- and three-dimensional models, respectively, for generating hypocycloidal and hypotrochoidal surfaces.
Figure 8:
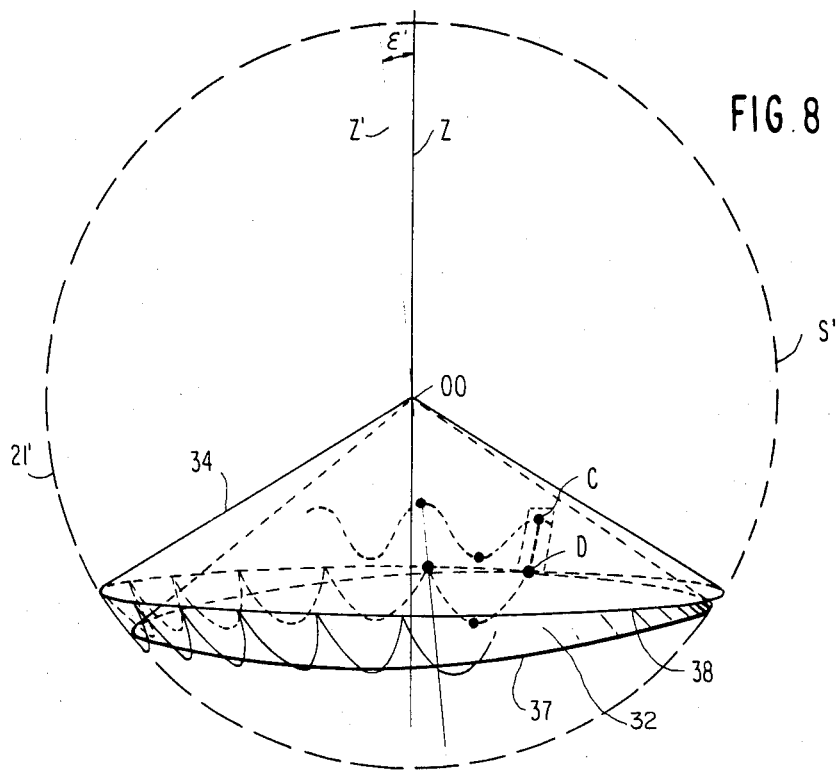

FIGS. 6 and 8 illustrate two- and three-dimensional models, respectively, for generating hypocycloidal and hypotrochoidal surfaces. In these figures, an outer cone 34, which has a fixed Z axis, is fixed to a sphere 21', which has a spherical surface S'. A lower circumferential line 38 of the fixed outer cone 34 extends over an arc $2\gamma_{O'}$ on the spherical surface S', and a lower circumferential line 37 of an inner, movable cone 65 extends over an arc $2\gamma_{i'}$ on the spherical surface S'. The inner, movable cone 65 is disposed within the outer fixed cone 34, and the inner, movable cone has a movable Z' axis which passes through the common apex OO of the inner and outer cones 65, 34. The movable Z' axis is offset from the fixed Z axis by an angle $\epsilon'$ shown in FIGS. 6 and 8. The inner, movable cone 65 is capable of nutating about the fixed, outer cone 34 so that the movable Z' axis of the movable cone 65 revolves about the fixed Z axis of the outer cone 34. As the inner cone 65 nutates, varying portions of its lower circumferential line 37 are kept in continuous contact with varying portions of the lower circumferential line 38 of the outer cone 34. The inner, movable cone 65 has a leg portion CD which lies on the spherical surface S', and the outermost point C of the leg portion CD is displaced from the point D, which is located on the lower circumferential line 37 of the inner cone, by an angle $\gamma'_{CD}$ shown in FIGS. 6 and 8.

The generation of hypocycloidal and hypotrochoidal surfaces which utilize the cones shown in FIGS. 6 and 8 is similar to that described in the discussion related to FIGS. 5 and 7 for generating the epicycloidal and epitrochoidal surfaces, except that, in FIGS. 6 and 8, it is the inner cone which nutates rather than the outer cone, as is the case in FIGS. 5 and 7. As the inner cone 65 nutates, the point D traces out a hypocycloidal line, while the point C traces out a hypotrochoidal line. Hypocycloidal and hypotrochoidal surfaces can readily be generated from these lines, as described in the discussion relating to FIGS. 5 and 7.

The actual parametric, mathematical formula for determining the optimum dimensions of the epicycloidal, epitrochoidal, hypocycloidal and hypotrochoidal surfaces are quite complex because three-dimensional surfaces are being generated. However, one criterion which must be satisfied is that the number of lobes which are generated by the points A–D as these points revolve around the fixed cone axis Z must be an exact integer so that the points A–D return to their exact original position after undergoing one complete revolution around the circumferential line of the fixed cone. Regarding the generation of the epicycloidal or epitrochoidal surface, it can readily be shown that, to satisfy the condition that the number of lobes formed be an exact integer, the following relationship must be satisfied:

$$\frac{\sin \gamma_O}{\sin (\gamma_O - \epsilon)} = \frac{n}{n-1}$$

where (n−1) represents the number of lobes of the epicycloidal or epitrochoidal surface.

Regarding the hypocycloidal or hypotrochoidal surface, to satisfy the above-mentioned condition, the following relationship must be satisfied:

$$\frac{\sin \gamma_O}{\sin (\gamma_O + \epsilon)} = \frac{n}{n+1}$$

where (n+1) represents the number of lobes of the hypocycloidal or hypotrochoidal surface.

It should also be noted that the sum $\epsilon + \epsilon'$ should equal the nutating angle of the cam 20 of the input shaft 10 in the embodiment shown in FIG. 1.

As described in copending application Ser. Nos. 313,442 and 362,195, filed on Oct. 20, 1982 and Mar. 26, 1982, respectively, the disclosure of which is incorporated herein by reference, the balls or rollers which are disposed between the conjugate pairs of epi- and hypocycloidal surfaces have a maximum velocity as they travel through the "loops" of the epi- and hypocycloids and have a minimum velocity which is, in fact, 0, when they pass through the "nodes" adjoining adjacent "loops". However, the velocities and accelerations of the balls or rollers is less extreme in the case where conjugate pairs of epi- and hypotrochoidal surfaces are utilized. In addition, it is possible to form conjugate pairs of epi- and hypotrochoidal surfaces which aid the acceleration of the balls or rollers by varying $\epsilon + \epsilon'$. Accordingly, in practice, the effect of the acceleration of the rollers should be considered in determining the optimum value of the angles shown in FIGS. 5–8. However, in the drive of FIG. 3, the actual size of the lobes should not be so large that it allows the nearest surfaces of the conjugate pairs of surfaces to contact each other when the assembled gear is operated. An additional criterion which must be satisfied is that the generating point A of FIG. 5 and the generating point C of FIG. 6 should be of identical radii in order to form conjugate pairs of races. In this case, the following criteria must be satisfied:

$$\gamma_O + \gamma_{AB} = \gamma_i + \gamma_{LD}.$$

Computers can be used to analyze the above-mentioned considerations to generate numerical and discrete solutions for determining optimum values of the angles shown in FIGS. 5–8.

While the foregoing embodiments are presently preferred, it is understood that numerous modifications may be made by those of skill in the art; and it is intended to cover in the appended claims all such modifications as fall within the spirit and scope of the invention.

We claim:

1. A nutating gear reduction mechanism, comprising: a stator, an output member and an intermediate member, said intermediate member being mounted for nutating movement, and rolling elements transmitting torque between said stator and said intermediate member and from said intermediate member to said output member, respectively, said stator, output member and intermediate member being provided with rolling element engaging surfaces, a first set of rolling elements operating between said stator and said intermediate member, and a second set of rolling elements operating between said intermediate member and said output member, said first and second sets of rolling elements comprising spherical balls, each of said balls being in substantially continuous, rolling contact with two of said engaging surfaces.

2. A nutating gear reduction mechanism as claimed in claim 1, wherein each of said engaging surfaces are provided with substantially trochoidal curvature.

3. A nutating gear reduction mechanism as claimed in claim 1, wherein at least two of said engaging surfaces are provided with substantially trochoidal curvature.

4. A nutating gear reduction mechanism as claimed in claim 1, wherein two of said engaging surfaces are provided with oval cups entraining a series of said balls therebetween and constituting a coupling between the respective surfaces.

5. A nutating gear reduction mechanism as claimed in claim 4, wherein torque transmission through said coupling is effected at constant velocity.

6. A nutating gear reduction mechanism as claimed in claim 5, wherein said coupling joins said stator and said intermediate member such that said intermediate member is rotationally stationary with respect to said stator.

7. A nutating gear reduction mechanism as claimed in claim 2, wherein said stator trochoidal surface is formed in a housing of the gearing.

8. A nutating gear reduction mechanism as claimed in claim 3, wherein said stator and said output member are identical but for the respective engaging surfaces formed thereon, said stator being locked to a gearing housing.

9. A rotating gear reduction mechanism as claimed in claim 1, wherein said engaging surfaces comprise at least one pair of conjugate epi- and hypotrochoidal surfaces, said hypotrochoidal surface having a number of lobes which is two greater than a number of lobes on said epitrochoidal surface, a number of balls in substantially, continuous rolling contact with said epi- and hypotrochoidal surfaces being one greater than said number of lobes of said epitrochoidal surface.

10. A nutating gear reduction mechanism, comprising: a stator, an output and a nutating member, input means initiating nutating movement of said nutating member; and third elements operating between said stator and said nutating member, and between said nutating member and said output, said third elements comprising spherical balls which simultaneously and substantially continuously engage both of two coacting races or grooves formed on said stator and nutating member, and said nutating member and said output, respectively, said balls being in rolling contact with, and transmitting torque between said stator and said nutating member, and said nutating member and said output, respectively.

11. A speed reduction gearing mechanism of the nutating type, comprising: a stator, an output member and intermediate idler means, said idler means comprising a pair of nutating, rotatable members arranged in mirror-image fashion with respect to a plane transverse to an axis of said gearing mechanism, and rolling, torque transmitting ball elements arranged between a first idler and said stator, between said two idlers, and between a second idler and said output, respectively, said ball elements continuously engaging a pair of engagement surfaces of trochoidal curvature, and following generally trochoidal paths during the transmission of torque from said input to said output.

* * * * *